United States Patent
Han et al.

(10) Patent No.: US 7,164,374 B2
(45) Date of Patent: Jan. 16, 2007

(54) DEMODULATION APPARATUS AND METHOD USING CODE TABLE THAT DECREASES COMPLEXITY

(75) Inventors: Sung-hyu Han, Seoul (KR); Ki-hyun Kim, Gyeonggi-do (KR); In-sik Park, Gyeonggi-do (KR); Yoon-woo Lee, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 11/126,145

(22) Filed: May 11, 2005

(65) Prior Publication Data

US 2005/0206540 A1 Sep. 22, 2005

Related U.S. Application Data

(63) Continuation of application No. 10/729,993, filed on Dec. 9, 2003, now Pat. No. 6,956,508.

(30) Foreign Application Priority Data

Dec. 18, 2002 (KR) .............................. 2002-81028

(51) Int. Cl.
*H03M 7/00* (2006.01)
(52) U.S. Cl. ...................................... 341/106
(58) Field of Classification Search ................ 341/107, 341/106, 51, 55, 50, 59, 63
See application file for complete search history.

(56) References Cited

U.S. PATENT DOCUMENTS

| 4,121,259 A | * | 10/1978 | Preuss et al. ................ 382/246 |
| 5,253,053 A | * | 10/1993 | Chu et al. ................ 375/240.23 |
| 5,844,508 A | * | 12/1998 | Murashita et al. ............. 341/51 |
| 6,177,892 B1 | | 1/2001 | Ko |
| 6,956,508 B1 | | 10/2005 | Han et al. |
| 6,965,780 B1 | * | 11/2005 | Monogioudis et al. ...... 455/522 |
| 2002/0174400 A1 | | 11/2002 | Yamada |
| 2004/0028150 A1 | | 2/2004 | Kim et al. |

FOREIGN PATENT DOCUMENTS

| EP | 1 370 002 A1 | 12/2003 |
| JP | 2004-15801 | 1/2004 |

OTHER PUBLICATIONS

Anim-Appiah et al., "Turbo Codes Cascaded with High-Rate Block Codes for (O, k)-Constrained Channels", IEEE Journal on Selected Areas in Communications IEEE USA, vol. 19, No. 4, Apr. 2001.
Fan et al., "Constrained Coding Techniques For Software Iterative Decoders", Proc. of IEEE Global Telecommunications Conference 1999, vol. 1B, Dec. 1999.

(Continued)

*Primary Examiner*—Brian Young
(74) *Attorney, Agent, or Firm*—Stein, McEwen & Bui, LLP

(57) ABSTRACT

A demodulation apparatus and method using a code table that decreases complexity. The demodulation apparatus includes a code table including a plurality of the code words, wherein similar ones of the code words are arranged to be grouped together; and a soft demodulator to calculate probabilities of individual bits that constitute the code words, and to generate a soft demodulation value of the data word.

14 Claims, 4 Drawing Sheets

OTHER PUBLICATIONS

McPheters et al., "Turbo-Coded Optical Recording Channels With DVD Minimum Mark Size", IEEE Transactions on Magnetics IEEE USA, vol. 38, No. 1, Jan. 2002.

Laura L. McPheters et al., "Turbo-Coded Optical Recording Channels With DVD Minimum Mark Size", *IEEE Transactions On Magnetics*, vol. 38, No. 1, Jan. 2002, pp. 298-302.

U.S. Appl. No. 10/729,993, filed Dec. 9, 2003, Sung-hyu Han, et al., Samsung Electronics Co., Ltd.

Office Action issued Jan. 17, 2006 re: Japanese Patent Application No. 2003-419620 by the Japan Patent Office.

Laura L. McPheters and Steven W. McLaughlin, "Turbo Coded Optical Recording Channels with DVD Minimum Mark Size," *IEEE Transactions on Magnetics*, vol. 38, No. 1, Jan. 2002 (6 pp, pp. 298-302).

\* cited by examiner

FIG. 1 (PRIOR ART)

|      | 00        | 01        | 10        | 11        |
|------|-----------|-----------|-----------|-----------|
| 1    | 010010010 | 100010001 | 010010001 | 101010101 |
| ...  | ...       | ...       | ...       | ...       |
| 1400 | 010101001 | 101010000 | 001010001 | 101010010 |

| | dkdk+1 | | | | | |
|---|---|---|---|---|---|---|
| 1 | 0 0 0 | 0 0 0 | 0 1 0 | 0 0 0 | 1 0 0 | 0 0 0 |
| 2 | 0 0 1 | 0 0 1 | 0 0 0 | 0 0 0 | 0 1 0 | 0 0 0 |
| 3 | 0 0 0 | 0 0 0 | 0 1 0 | 0 0 0 | 1 0 0 | 0 0 1 |
| 4 | 0 0 1 | 0 0 1 | 0 0 0 | 0 0 0 | 0 1 0 | 0 0 1 |
| 5 | 0 0 0 | 0 0 0 | 1 0 0 | 0 1 0 | 1 0 0 | 1 0 1 |
| 6 | 0 0 1 | 0 0 1 | 0 1 0 | 0 0 0 | 1 0 0 | 0 0 0 |
| 7 | 0 0 0 | 0 0 0 | 1 0 0 | 0 1 0 | 1 0 1 | 0 0 0 |
| 8 | 0 0 1 | 0 0 1 | 0 1 0 | 0 0 0 | 1 0 0 | 0 0 1 |

FIG. 3B

| | dkdk+1 | | | | | |
|---|---|---|---|---|---|---|
| 1 | 0 0 0 | 0 0 0 | 0 1 0 | 0 0 0 | 1 0 0 | 0 0 0 |
| 2 | | | | | 1 0 0 | 0 0 1 |
| 3 | | | 1 0 0 | 0 1 0 | 1 0 0 | 1 0 1 |
| 4 | | | | | 1 0 1 | 0 0 0 |
| 5 | 0 0 1 | 0 0 1 | 0 0 0 | 0 0 0 | 0 1 0 | 0 0 0 |
| 6 | | | | | 0 1 0 | 0 0 1 |
| 7 | | | 0 1 0 | 0 0 0 | 1 0 0 | 0 0 0 |
| 8 | | | | | 1 0 0 | 0 0 1 |

FIG. 4A (PRIOR ART)

|     | dkdk+1            |
| --- | ----------------- |
| 1   | a1 b1 c1 d1 e1 f1 |
| 2   | a1 b1 c1 d2 e2 f2 |
| 3   | a1 b1 c1 d3 e3 f3 |
| 4   | a2 b2 c2 d4 e4 f4 |
| 5   | a2 b2 c2 d5 e5 f5 |
| 6   | a2 b2 c2 d6 e6 f6 |
| 7   | a2 b2 c2 d7 e7 f7 |
| 8   | a3 b3 c3 d1 e1 f1 |
| 9   | a3 b3 c3 d2 e2 f2 |
| 10  | a3 b3 c3 d3 e3 f3 |

FIG. 4B

|     | dkdk+1 | |
| --- | --- | --- |
| 1   | a1 b1 c1<br><br>a3 b3 c3 | d1 e1 f1<br>d2 e2 f2<br>d3 e3 f3 |
| 2   | a2 b2 c2 | d4 e4 f4<br>d5 e5 f5<br>d6 e6 f6<br>d7 e7 f7 |

DEMODULATION APPARATUS AND METHOD USING CODE TABLE THAT DECREASES COMPLEXITY

CROSS-REFERENCE TO RELATED APPLICATIONS

This application is a continuation of application Ser. No. 10/729,993 filed on Dec. 9, 2003, now a U.S. Pat. No. 6,956,508. The content of application Ser. No. 10/729,993 is hereby incorporated herein by reference in their entirety.

This application claims the benefit of Korean Patent Application No. 2002-81028, filed on Dec. 18, 2002, in the Korean Intellectual Property Office, the disclosure of which is incorporated herein by reference.

BACKGROUND OF THE INVENTION

1. Field of the Invention

The present invention relates to signal demodulation technology, and, more particularly, to a demodulation apparatus and method using a code table in a soft demodulator, which decreases complexity and increases demodulation efficiency.

2. Description of the Related Art

Generally, in an environment utilizing high-density optical recording media, inter symbol interference (ISI) exists, and data is modulated using run-length limited (RLL) codes.

When conventional RLL codes are decoded, a channel demodulator, for example, a Viterbi decoder, detects code words from a signal input through a channel, and an RLL decoder decodes the code words into data words using a decoding table.

Recently, soft demodulators and soft decoders have experienced increased usage. The above-described Viterbi decoder directly outputs a code word, which contains an error and has only a value of 1 or −1. This method is referred to as hard demodulation. However, in soft demodulation, a soft channel detector receives a channel signal and outputs the probability value of a code word. In other words, the soft channel detector outputs an analog value such as 0.8 or −0.8 containing the probability of a code value being 1 or −1. A soft demodulator receives data indicating the probability value of the code word and outputs the probability value of a data word. Then, a soft decoder, such as a turbo decoder, receives and decodes the probability value of the data word, and forms the data word.

Turbo decoding requiring soft modulation was introduced by Laura L. McPheters and Steven W. McLaughlin ["Turbo-Coded Optical Recording Channels with DVD Minimum Mark Size", IEEE Transactions on Magnetics, Vol. 38, No. 1, pp. 298–302, January].

The following description concerns the operation of the above-described soft demodulator, which receives data indicating the probability value of a code word and obtains a log likelihood ratio (LLR) value indicating the probability of each bit constituting a data word. The operation will be described with reference to the table shown in FIG. 1.

FIG. 1 shows a decoding table having a code rate of 2/3 for RLL(1, 7) codes. The first row of the table shows 2-bit data words resulting from the decoding process, and the values shown below each of the data words are the code words corresponding to each data word. FIG. 1 shows an example of using a 9-bit code word in order to decode a 2-bit data word.

In order to obtain an LLR value, A Posteriori Probability (APP) ($d_k=1$) and APP($d_k=0$) are calculated. APP($d_k=1$) is a value indicating the probability of demodulated data $d_k$ being 1, and APP($d_k=0$) is a value indicating the probability of demodulated data $d_k$ being 0. When the length of a code word, which is used for determining a data word, is t bits, values of $r_m-(2*c_m-1))^2$ are obtained for the individual bits of a code word setting one bit of the data word to 1, and then the values are summed up. Here, m=0, . . . , t-1. APP($d_k=1$) is obtained by summing up the exponential values obtained with respect to all M code words, which set one bit of the data word to 1, as shown in Formula (1).

$$APP(d_k = 1) = \sum_{j \in S_1(k)} \exp\left[(r_m^j - (2*c_m^j - 1))^2\right] \quad (1)$$

Here, j indicates that a value of a j-th data word is 1, and $S_1(k)$ is the set of entries corresponding to $d_k d_{k+1}=10$ and entries corresponding to $d_k d_{k+1}=11$ in the table shown in FIG. 1.

APP($d_k=0$) is obtained in the same manner as APP($d_k=1$), that is, it is obtained according to Formula (2).

$$APP(d_k = 0) = \sum_{j \in S_0(k)} \exp\left[(r_m^j - (2*c_m^j - 1))^2\right] \quad (2)$$

Here, $S_0(k)$ is the set of entries corresponding to $d_k d_{k+1}=00$ and entries corresponding to $d_k d_{k+1}=01$ in the table shown in FIG. 1.

LLR($d_k$) is the exponential value of a ratio expressed by Formula (3). The ratio is defined as the probability that one bit of the data word $d_k$ resulting from demodulation of a received code word is 0 to the probability that the one bit of the data word $d_k$ is 1. LLR($d_k$) is an output of the soft demodulator.

$$LLR(d_k) = \log\left(\frac{Pr(d_k = 1 \mid R)}{Pr(d_k = 0 \mid R)}\right), R = r_0, r_1, \ldots, r_{t-1} \quad (3)$$

$$= \log\left(\frac{Pr(R \mid d_k = 1)}{Pr(R \mid d_k = 0)}\right)$$

$$= \left(\log\left(\frac{\sum_{j \in S_1(k)} Pr(R \mid C^j \text{transmitted})}{\sum_{j \in S_0(k)} Pr(R \mid C^j \text{transmitted})}\right)\right)$$

When the assumption is made that the frequency of $C^j$ in $S_0(k)$ is the same as that in $S_1(k)$, the probability Pr(R|$C^j$) is expressed by Formula (4).

$$Pr(R \mid C^j) = \left(\frac{1}{\sqrt{2\pi}\,\sigma}\right)^t \exp\left[-\frac{1}{2\sigma^2}\sum_{m=0}^{t-1}(r_m^j - (2*c_m^j - 1))^2\right] \quad (4)$$

Accordingly, Formula (3) can be rewritten as Formula (5).

$$\log\left(\frac{\sum_{j \in S_1(k)} Pr(R \mid C^j \text{transmitted})}{\sum_{j \in S_0(k)} Pr(R \mid C^j \text{transmitted})}\right) = \log \frac{\sum_{j \in S_1(k)} \exp\left[\frac{1}{\sigma^2} \sum_{m=0}^{t-1} r_m^j * (2 * c_m^j - 1)\right]}{\sum_{j \in S_0(k)} \exp\left[\frac{1}{\sigma^2} \sum_{m=0}^{t-1} r_m^j * (2 * c_m^j - 1)\right]} \quad (5)$$

$$= \log \sum_{j \in S_1(k)} \exp\left[\frac{1}{\sigma^2} \sum_{m=0}^{t-1} r_m^j * (2 * c_m^j - 1)\right] -$$

$$\log \sum_{j \in S_0(k)} \exp\left[\frac{1}{\sigma^2} \sum_{m=0}^{t-1} r_m^j * (2 * c_m^j - 1)\right]$$

$$(\max_{j \in S_1(k)}\left[\frac{1}{\sigma^2} \sum_{m=0}^{t-1} r_m^j * (2 * c_m^j - 1)\right] -$$

$$\max_{j \in S_0(k)}\left[\frac{1}{\sigma^2} \sum_{m=0}^{t-1} r_m^j * (2 * c_m^j - 1)\right]$$

When max-log approximation is used as expressed by Formula (6), Formula (5) can be rewritten as Formula (7) because the same performance is exhibited even if $$\frac{1}{\sigma^2}$$

is ignored.

$$\log(e^{\delta_1} + e^{\delta_2} + \ldots + e^{\delta_n})(\max_{j \in \{1,2,\ldots,n\}} \delta_j) \quad (6)$$

In other words, the $LLR(d_k)$ is obtained, as shown in Formula (7), by calculating a maximum value instead of an exponential value, when exponential calculation is complex, and calculating $APP(d_k=1) - APP(d_k=0)$, instead of performing the division expressed in Formula (3).

$$LLR(d_k) = \quad (7)$$

$$\max_{j \in S_1(k)}\left[\sum_{m=0}^{t-1} r_m^j * 2(c_m^j - 1)\right] - \max_{j \in S_0(k)}\left[\sum_{m=0}^{t-1} r_m^j * 2(c_m^j - 1)\right]$$

$LLR(d_{k+1})$ can be obtained by applying k+1, instead of k, to Formula (7), as shown in Formula (8).

$$LLR(d_{k+1}) = \quad (8)$$

$$\max_{j \in S_1(k+1)}\left[\sum_{m=0}^{t-1} r_m^j * 2(c_m^j - 1)\right] - \max_{j \in S_0(k+1)}\left[\sum_{m=0}^{t-1} r_m^j * 2(c_m^j - 1)\right]$$

Here, $S_0(k+1)$ is the set of entries corresponding to $d_k d_{k+1}=00$ and entries corresponding to $d_k d_{k+1}=10$ in the table shown in FIG. 1, and $S_1(k+1)$ is the set of entries corresponding to $d_k d_{k+1}=01$ and entries corresponding to $d_k d_{k+1}=11$ in the table shown in FIG. 1.

As described above, when the size of an APP decoding table used in the conventional soft demodulator increases, the time required for calculating an LLR also increases, and the APP decoding table becomes remarkably complicated.

SUMMARY OF THE INVENTION

The present invention provides a demodulation apparatus and method using a code table in a soft demodulator, which decreases complexity and increases demodulation efficiency.

The present invention also provides a demodulation apparatus and method using a code table which decreases complexity in order to obtain soft demodulation results of a run-length limited (RLL) code.

Additional aspects and/or advantages of the invention will be set forth in part in the description which follows and, in part, will be obvious from the description, or may be learned by practice of the invention.

According to an aspect of the present invention, there is provided an apparatus which demodulates a code word having a second predetermined bit length greater than a first predetermined bit length, the code word resulting from modulation of a data word having the first predetermined bit length. The apparatus includes a code table comprising a plurality of the code words, wherein similar ones of the code words are arranged to be grouped together; and a soft demodulator to calculate probabilities of individual bits that constitute the code words, and to generate a soft demodulation value of the data word.

According to another aspect of the present invention, there is provided a method of demodulating a code word having a second predetermined bit length greater than a first predetermined bit length, the code word resulting from modulation of a data word having the first predetermined bit length. The method includes using a code table comprising a plurality of code words, wherein similar ones of the code words are arranged to be grouped together; and calculating probabilities of individual bits that constitute the code words, and generating a soft demodulation value of the data word.

BRIEF DESCRIPTION OF THE DRAWINGS

The above and/or other features and advantages of the present invention will become more apparent by describing in detail preferred embodiments thereof with reference to the attached drawings in which:

FIG. 1 shows an example of a table illustrating a conventional soft demodulator;

FIGS. 3A and 3B show an example of a conventional code table and an example of a code table that decreases complexity according to an embodiment of the present invention; and FIGS. 4A and 4B show another example of a conventional code table and another example of a code table that decreases complexity according to another embodiment of the present invention.

DETAILED DESCRIPTION OF THE PREFERRED EMBODIMENTS

Figure 2:
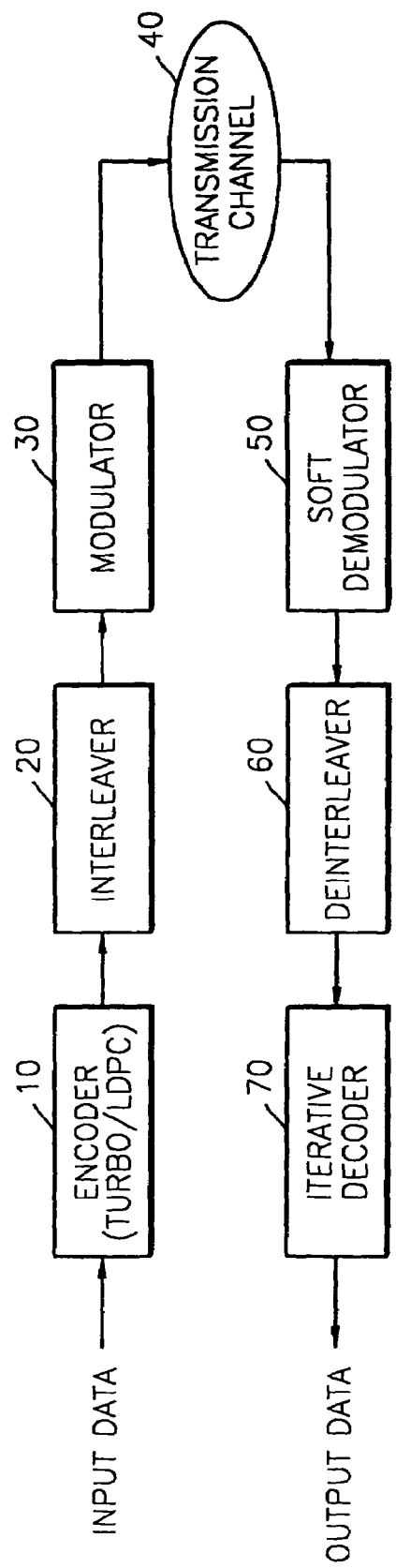
FIG. 2 is a block diagram of a system which applies the present invention.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

Referring to FIG. 2, a system which applies the present invention includes an encoder 10, an interleaver 20, a modulator 30, a transmission channel 40, a soft demodulator 50, a deinterleaver 60, and an iterative decoder 70. However, various modifications can be made to the system. For example, the interleaver 20 and the deinterleaver 60 may not be provided, or a soft channel detector, between the transmission channel 40 and the soft demodulator 50, may be further provided.

The encoder 10 encodes input data using predetermined soft encoding, such as Low Density Parity Check (LDPC) coding and/or turbo coding, for error correction. The interleaver 20 interleaves the encoded data in a predetermined order and provides the interleaved data to the modulator 30. The modulator 30 modulates the interleaved data using an appropriate method, for example, using run-length limited (RLL) codes. The modulated data is distorted after passing through the transmission channel 40, such as a recording medium, and then input to the soft demodulator 50.

The soft demodulator 50 calculates the probabilities of individual bits, which constitute a code word that is input through the transmission channel 40, and provides a soft value of the data word to the deinterleaver 60. The deinterleaver 60 deinterleaves the soft value and restores the data before it is decoded. The iterative decoder 70 performs soft decoding on the deinterleaved data according to the predetermined soft coding performed by the encoder 10, outputs the decoded data and additional status information indicating whether the decoding has failed or succeeded, and performs iterative decoding according to the additional status information, thereby increasing the performance of signal detection and error correction.

FIG. 3A shows an example of the conventional code table. FIG. 3B shows an example of a code table used in the soft demodulator 50 shown in FIG. 2, which decreases complexity by rearranging the code words shown in FIG. 3A. In the examples shown in FIGS. 3A and 3B, a 16-bit code word is used to decode a 2-bit data word.

As shown in the conventional code table of FIG. 3A, entries are simply enumerated in a single column, with one code word per row in the single column. However, in the code table according to an embodiment of the present invention shown in FIG. 3B, similar entries are arranged to be grouped together. That is, entries are arranged in a plurality of columns, with various numbers of sections per column, such that common portions of the code words are displayed in the same column, and common neighboring portions are written one time in each section. The number of calculations can be reduced by reusing the calculation results of the code table shown in FIG. 3B. In the code table shown in FIG. 3B, one column is divided into three columns. However, the column may be divided into two or six columns.

Although the code table shown in FIG. 3B has the same content as the conventional code table shown in FIG. 3A, since entries are efficiently arranged in the code table shown in FIG. 3B, the number of calculations and calculation time is reduced when a log likelihood ratio (LLR) is calculated. For example, assume that $S_1(k)$ shown in Formula (7) is a set of 8 elements, as shown in the conventional code table of FIG. 3A. When an LLR is calculated using the conventional code table shown in FIG. 3A, 8*17=136 additions or subtractions are required. However, when the code table shown in FIG. 3B is used, the number of additions or subtractions are reduced because only one calculation is performed for each common portion of the code words. For example, the result of one calculation on 000 000 is used four times, and the result of one calculation on 010 000 is used two times, without repeating the calculations. Accordingly, when the code table shown in FIG. 3B is used, 14*5+12=82 additions or subtractions are required.

FIG. 4A shows another example of a conventional code table. FIG. 4B shows another example of a code table used in the soft demodulator 50 shown in FIG. 2, which decreases complexity by rearranging the code words shown in FIG. 4A. In FIGS. 4A and 4B, which are more generalized than FIGS. 3A and 3B, each of the reference characters a, b, c, d, e, and f indicate three bits, and a 16-bit code word is used to decode a 2-bit data word. In the code table shown in FIG. 4B, one column is divided into two columns. However, the column may be divided into three or six columns.

When the LLR is calculated using the conventional code table shown in FIG. 4A, 10*17=170 additions or subtractions and 9 calculations of a maximum function are required. However, when the LLR is calculated using the code table according to this embodiment of the present invention, which is shown in FIG. 4B, 10*8+2=82 additions or subtractions and 7 calculations of a maximum function are required.

As described above, after receiving an output signal of a channel or a soft channel detector, the present invention uses an efficiently configured decoding table to perform soft demodulation on RLL codes and provide the same results of soft demodulation as the conventional technology, but with a smaller number of calculations and within a shorter amount of time.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An apparatus to demodulate code words resulting from modulation of respective data words, the apparatus comprising:
    an efficiently configured decoding table to perform soft demodulation on code words;
    wherein the decoding table is divided into a predetermined number of columns to contain all the code words, and wherein the code words are allocated to the predetermined number of columns such that common portions of the code words are arranged in common ones of the predetermined number of columns, and calculations on the common portions of the code words arranged in common ones of the predetermined number of columns are not repeated.

2. The apparatus as claimed in claim 1, wherein common neighboring portions of the code words are written one time in a single section of the respective common ones of the predetermined number of columns.

3. The apparatus as claimed in claim 1, wherein ta result of a calculation on a code word portion in the decoding table is reused, without performing the calculation again, in response to a current code word having an identical portion to the code word portion already calculated.

4. An apparatus to demodulate code words resulting from modulation of respective data words, the apparatus comprising:
   a soft demodulator to demodulate an input signal corresponding code words; and an efficiently configured decoding table used by the soft demodulator to perform soft demodulation on the code words,
   wherein the soft demodulator calculates probabilities of individual bits that constitute the code words to generate a demodulated signals,
   wherein the input signal is a run-length limited code signal transmitted through a transmission channel or output from a soft channel detector.

5. A method of demodulating code words which result from modulation of respective data words, the method comprising:
   performing soft demodulation on code words using an efficiently configured decoding table;
   wherein the decoding table is divided into a predetermined number of columns to contain all the code words, and
   wherein the code words are allocated to the predetermined number of columns such that common portions of the code words are arranged in common ones of the predetermined number of columns, and calculations on the common portions of the code words arranged in common ones of the predetermined number of columns are not repeated.

6. The method as claimed in claim 5, wherein common neighboring portions of the code words are written one time in a single section of the respective common ones of the predetermined number of columns.

7. The method as claimed in claim 5, further comprising reusing a result of a calculation on a code word portion in the decoding table, without performing the calculation again, in response to a current code word having an identical portion to the code word portion already calculated.

8. A method of demodulating code words which result from modulation of respective data words, the method comprising:
   performing soft demodulation on an input signal corresponding to code words, using an efficiently configured decoding table;
   wherein the decoding table is divided into a predetermined number of columns to contain all the code words,
   wherein the input signal is a run-length limited code signal transmitted through a transmission channel or output from a soft channel detector, and
   wherein calculations on common portions of the code words arranged in common ones of the predetermined number of columns are not repeated.

9. The apparatus as claimed in claim 1, further comprising a soft demodulator arranged to perform only one calculation for each common portion of the code words regarding probabilities of individual bits that constitute the code words, such that calculations on the common portions of the code words are not repeated.

10. The apparatus as claimed in claim 4, wherein the soft demodulator is configured to perform only one calculation for each common portion of the code words regarding probabilities of individual bits that constitute the code words to generate the demodulated signal, such that calculations on the common portions of the code words are not repeated.

11. The method as claimed in claim 5, wherein the soft demodulation is performed such that only one calculation for each common portion of the code words is made regarding probabilities of individual bits that constitute the code words, and calculations on the common portions of the code words are not repeated.

12. The method as claimed in claim 8, wherein the soft demodulation is performed such that only one calculation for each common portion of the code words is made regarding probabilities of individual bits that constitute the code words, and calculations on the common portions of the code words are not repeated.

13. An apparatus comprising:
   a soft demodulator arranged to demodulate an input signal corresponding code words; and
   a code table configured with a predetermined number of columns in which common portions of code words are arranged in common ones of the predetermined number of columns,
   wherein the code table is used by the soft demodulator to perform only a single calculation for each common portion of the code words regarding probabilities of individual bits that constitute the code words.

14. The apparatus as claimed in claim 13, wherein the common neighboring portions of the code words are written one time in a single section of the respective common ones of the predetermined number of columns.

* * * * *

UNITED STATES PATENT AND TRADEMARK OFFICE
CERTIFICATE OF CORRECTION

| | | |
|---|---|---|
| PATENT NO. | : 7,164,374 B2 | Page 1 of 1 |
| APPLICATION NO. | : 11/126145 | |
| DATED | : January 16, 2007 | |
| INVENTOR(S) | : Sung-hyu Han et al. | |

It is certified that error appears in the above-identified patent and that said Letters Patent is hereby corrected as shown below:

Column 7, line 12, change "ta" to -- a --

Column 7, line 21, start a new paragraph after "; and"

Column 7, line 26, change "signals" to -- signal --

Signed and Sealed this

Twenty-fourth Day of April, 2007

JON W. DUDAS
*Director of the United States Patent and Trademark Office*